United States Patent
Tsuchiya et al.

(10) Patent No.: US 6,329,041 B1
(45) Date of Patent: Dec. 11, 2001

(54) HARD COAT FILM

(75) Inventors: Mitsuru Tsuchiya; Takahiro Niimi, both of Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/251,418

(22) Filed: Feb. 17, 1999

(30) Foreign Application Priority Data

Feb. 18, 1998 (JP) ................................................. 10-052853

(51) Int. Cl.$^7$ ............................... B32B 27/14; B32B 3/00
(52) U.S. Cl. ........................ 428/195; 428/212; 428/409; 428/207; 428/213; 428/217; 428/323
(58) Field of Search ..................................... 428/212, 195, 428/409, 207, 213, 217, 323

(56) References Cited

U.S. PATENT DOCUMENTS

| | | | |
|---|---|---|---|
| 4,528,222 | * 7/1985 | Rzepecki et al. | 428/35 |
| 4,584,259 | * 4/1986 | Mayer et al. | 430/273 |
| 4,746,574 | * 5/1988 | Hattori et al. | 428/409 |
| 4,981,743 | * 1/1991 | Ho | 428/64 |

* cited by examiner

*Primary Examiner*—William Krynski
*Assistant Examiner*—B. Shewareged
(74) *Attorney, Agent, or Firm*—Parkhurst & Wendel, L.L.P.

(57) ABSTRACT

The present invention relates to a hard coat film used for various types of displays, wherein cracking and peeling of the hard coat layer is prevented, hardness reduction of the hard coat film is suppressed and the pencil hardness of the hard coat film is in the range of 4H–8H. The hard coat film includes a buffer layer (2) with a thickness of 3–50 μm, formed on at least one side of a plastic base film (1), which has a buffer function against deformation of the hard coat layer in response to deformation of the plastic base film (1), and a hard coat layer (3) with a thickness of 3–15 μm additionally formed over the buffer layer. The hard coat film (9) is designed so that the pencil hardness of the plastic base film (1), the pencil hardness of the buffer layer and the pencil hardness of the hard coat layer increase in that order.

17 Claims, 2 Drawing Sheets

HARD COAT FILM

BACKGROUND OF THE INVENTION

The present invention relates to a hard coat film comprising a hard coat layer on a plastic base film. More specifically, the present invention relates to a hard coat film with excellent abrasion resistance and superior crack resistance, adhesion and resistance to the effects due to deformation, etc. of the plastic base film. The present invention is suitable as a touch panel surface protective film, for the surfaces of CRT, LCD, PDP and other displays, as well as household electric appliances.

In recent years, plastic products have been replacing glass products because of their workability and light weight. However, since plastic products are more prone to surface damage, they are usually covered with hard coat films in order to provide abrasion resistance. It is also becoming more common to cover conventional glass products with plastic films to prevent scattering when being broken, but because of their lack of hardness, hard coats are often formed over their surfaces.

A conventional hard coat film is usually produced by forming a thin coating film of a thermosetting resin or an ionizing radiation curing resin such as an ultraviolet curing resin, to about 3–15 $\mu$m either directly on a plastic base film or via a primer layer of about 1 $\mu$m.

However, while such conventional hard coat films have provided sufficient hardness, the fact that the coating films are of low thickness has led to the problem of deformation of the hard coat layers in response to deformation of the underlying plastic base films, resulting in lower overall hardness of the hard coat films, and their performance has therefore been unsatisfactory. For example, when polyethylene terephthalate films, which are widely used as plastic base films, are coated with hard coat films of ultraviolet curing paints to the thickness mentioned above, a pencil hardness of level 3H is common, but this does not approach the pencil hardness of glass which is 9H.

On the other hand, if the thickness of the hard coat layer is simply increased over the usual 3–15 $\mu$m, the hardness of the resulting hard coat film is improved but this leads instead to the problem of easier cracking and peeling of the hard coat layer, accompanied by more curling of the hard coat film due to cure shrinkage. For this reason, it has been difficult by conventional techniques to obtain hard coat films with satisfactory properties for practical use.

DISCLOSURE OF THE INVENTION

It is an object of the present invention to overcome the aforementioned problems of hard coat films which employ plastic base films, by providing a hard coat film wherein cracking and peeling of the hard coat layer of the hard coat film is effectively prevented and reduction in the hardness of the hard coat film due to deformation of the plastic base film is suppressed, and which has a pencil hardness in the range of 4H–8H approaching the hardness of glass.

The hard coat film of the invention designed to overcome the problems described above is a hard coat film comprising a plastic base film, a buffer layer composed of one or a plurality of layers with a thickness of 3–50 $\mu$m formed on at least one side of the plastic base film, and a hard coat layer with a thickness of 3–15 $\mu$m formed on the buffer layer, characterized in that the respective pencil hardnesses of the plastic base film, buffer layer and hard coat layer have increasing values in that order, in such a manner that the hard coat film as a whole has a pencil hardness of 4H to 8H.

Here, the buffer layer has the function of buffering the effects of any deformation of the plastic base film.

In the hard coat film of the present invention having the above-mentioned construction, it is normally preferred for the pencil hardness of the plastic base film to be 4B to HB, the pencil hardness of the hard coat layer to be 3H to 5H and the pencil hardness of the buffer layer to be a pencil hardness intermediate between the pencil hardness of the plastic base film and the pencil hardness of the hard coat layer, for a greater pencil hardness of the hard coat film as a whole.

The material used to form the hard coat layer and/or buffer layer is suitably an ionizing radiation curing resin which can give the desired pencil hardness for each layer and which facilitates film formation on plastic base films.

According to the present invention, the hard coat film may also be provided with glare resistance. Glare resistance may be provided, for example, by forming irregularities in the surface of the hard coat layer.

According to the present invention the hard coat film may also be provided with an anti-reflection property. An anti-reflection property can be achieved by forming an anti-reflection layer on the surface of the hard coat film.

The "Pencil hardness" used in the present invention is the value obtained by the pencil hardness test based on JIS-K5400, and it represents the hardness of the material measured. The pencil hardness test includes five repeated measurements by the pencil hardness test procedure, with the pencil hardness being the hardness of the pencil used for the test when none of the measurements result in scratches or other disturbances to the appearance. For example, if a 3H pencil is used for five test procedures and no appearance disturbances occur, then the pencil hardness of the material is at least 3H.

The pencil hardness can be used to measure not only single layers but also the laminated surfaces of laminated bodies, in the same manner as single layers.

In particular, the "layer pencil hardness" according to the present invention is the pencil hardness determined by the same pencil hardness test using a sample of a film formed by a layer forming material on the plastic base film used for the hard coat film, for example a polyethylene terephthalate film of 100 $\mu$m or more. In this case, it is preferred for the pencil hardness to be determined for a fixed dry film thickness, such as about 5 $\mu$m, of the film formed of the layer forming material.

BEST MODE FOR CARRYING OUT THE INVENTION

Figure 1:
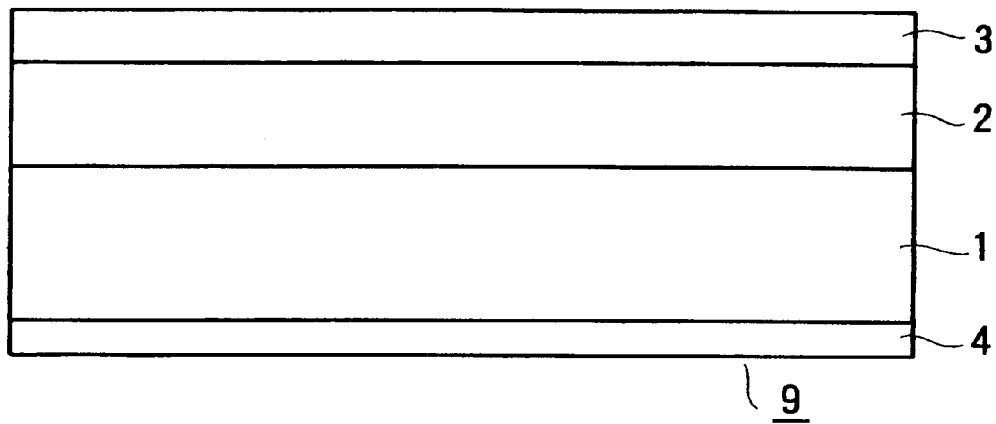
FIG. 1 is a cross-sectional schematic view of the basic layer structure of a hard coat film according to the present invention.

FIG. 1 shows the basic layer structure of a hard coat film 9 according to the present invention. In FIG. 1, a reference numeral 1 designates a plastic base film, a reference numeral 2 designates a buffer layer formed on the plastic base film 1, and a reference numeral 3 designates a hard coat layer formed on the buffer layer 2.

The hard coat film of the present invention is provided with hard properties by subjecting the plastic base film 1 to coating treatment on at least one side thereof. In other words, according to the present invention at least one side of the plastic base film 1 is provided with a buffer layer 2 with a thickness of 3–50 μm which serves as a buffer against deformation of the hard coat layer in response to deformation of the plastic base film 1, while a hard coat layer 3 with a thickness of 3–15 μm is additionally formed over the layer; by orderly increase of the pencil hardness of the plastic base film 1, the pencil hardness of the buffer layer 2 and the pencil hardness of the hard coat layer 3 it is possible to achieve a hard coat film 9 with a pencil hardness of 4H to 8H which has not been possible in the past with plastic materials. By such orderly increase of the pencil hardnesses of each formed layer, it unexpectedly occurs that the film as a whole exhibits a hardness comparable to glass hardness, and a film with excellent crack and peel resistance is obtained.

The discovery of the present inventors has shown that by orderly increasing the pencil hardness of the plastic base film, the pencil hardness of the buffer layer 2 and the pencil hardness of the hard coat layer in that order in a hard coat film such as described above, the pencil hardness of the laminate itself also increases in that order as laminating layers are added during the manufacturing process for the laminate.

Figure 2:
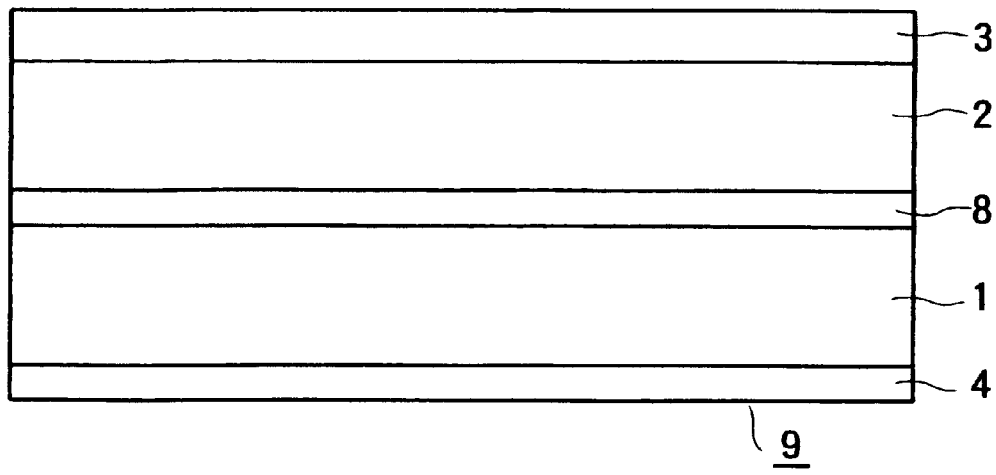
FIG. 2 is a cross-sectional schematic view of the basic layer structure of a hard coat film according to the present invention, where a primer layer has been added to the hard coat film of FIG. 1.

According to the present invention, the side of the plastic base film 1 in the hard coat film 9 opposite the hard coat layer 3 side may be provided with an adhesive layer 4 comprising an adhesive for attachment of the hard coat film to objects. Also, as shown in FIG. 2, a primer layer 8 of about 0.1–3 μm for improved adhesion may also be provided between the buffer layer 2 and the plastic base film 1.

Figure 3:
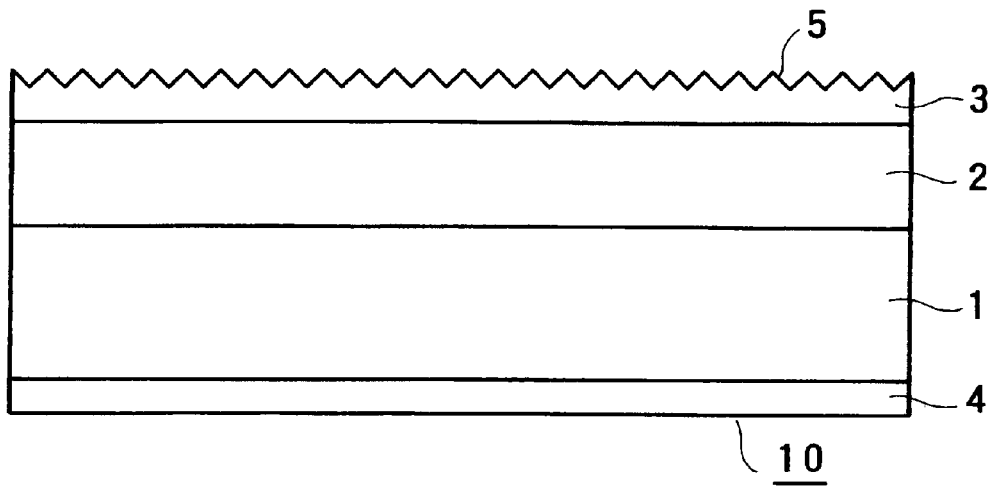
FIG. 3 is a cross-sectional schematic view of an example of the layer structure of another hard coat film according to the present invention, where the hard coat layer surface has been made irregular to provide glare resistance.

FIG. 3 shows another example of a layer structure of a hard coat film according to the present invention, wherein the hard coat film 10 has been provided with glare resistance by forming irregularities 5 in the surface of the hard coat layer 3.

Figure 4:
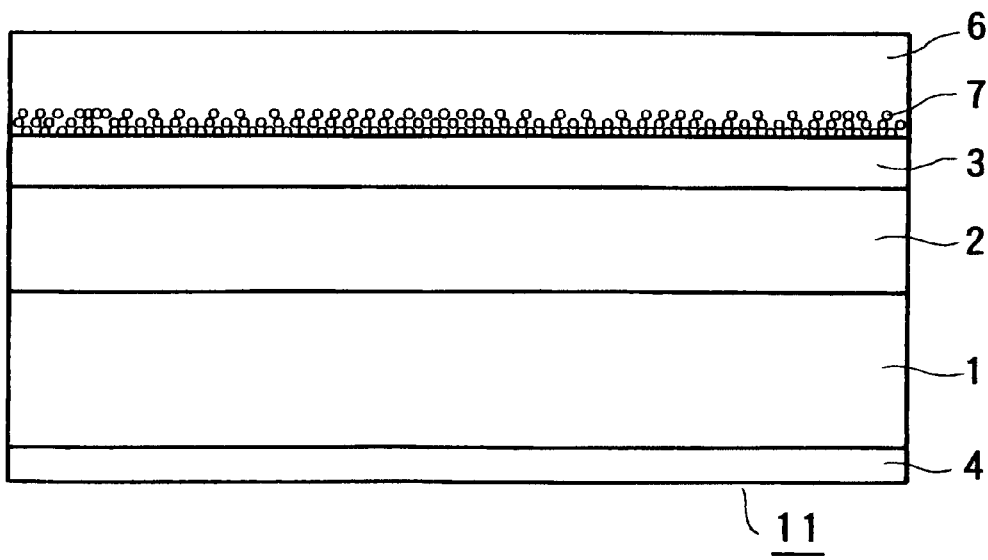
FIG. 4 is a cross-sectional schematic view of an example of the layer structure of still another hard coat film according to the present invention, where the hard coat layer of the hard coat film of FIG. 1 has been equipped with an anti-reflection layer to provide an anti-reflection effect.

FIG. 4 shows an example of the layer structure of yet another hard coat film of the present invention, which is a hard coat film 11 wherein the hard coat layer 3 of the hard coat film of FIG. 1 has been additionally provided with an anti-reflection layer 6 to give an anti-reflection effect to the hard coat film. If an ultrafine particle layer 7 of a metal oxide with a high refractive index is situated in the anti-reflection layer 6 near to the side of the hard coat layer 3, the anti-reflection layer 6 exhibits an anti-reflection effect due to the low refractive index of the surface side and the high refractive index of the ultrafine particle layer 7 portion.

The plastic base film is not particularly limited and may be any common plastic film, a suitable example being a polyethylene terephthalate film. When the surface of the object to which the hard coat film is to be applied is required to be visible, a transparent plastic base film is used. Such plastic base films usually have pencil hardnesses in the range of 4B–HB, but the pencil hardness of the plastic base film of the resent invention is not limited to this range, and it may be any appropriate range suited for the type of film employed.

The thickness of the buffer layer is preferably 3–50 μm, and more preferably 3–30 μm. If the thickness of the buffer layer is less than 3 μm, it will have an insufficient buffering effect on deformation of the hard coat layer in response to deformation of the plastic base film, and the pencil hardness will not be improved, while if it is over 50 μm the pencil hardness will be improved but cracking and peeling will more readily occur. From the standpoint of suppressing the effects of deformation of the plastic base film and increasing the hardness of the hard coat film, the thickness of the buffer layer is preferred to be greater than the thickness of the hard coat layer.

The pencil hardness of the buffer layer is preferred to be in a pencil hardness range which is intermediate between the pencil hardness of the plastic base film (for example, 4B–HB) and the pencil hardness of the hard coat layer (3H–5H), from the standpoint of buffering the effects of deformation of the base film, preventing lower pencil hardness of the hard coat layer, and avoiding cracking and peeling.

As materials for forming the buffer layer there may be mentioned ionizing radiation curing resins, thermosetting resins, thermoplastic resins and engineering plastics. Ionizing radiation curing resins are preferred because they can be easily formed into films on plastic base films and can easily give the desired high pencil hardness values.

By adding a coloring agent to the buffer layer-forming material it is possible to adjust the transmittance of the hard coat film without lowering the hardness of the hard coat layer. This is particularly preferred for displays since it can provide enhanced contrast. Dyes and pigments can normally be used as coloring agents, and 2 or more types of coloring agents may also be combined to adjust the hue. Examples of organic pigments include carbon black, phthalocyanine-based pigments, indanthrene blue-based pigments, quinacridone-based pigments, watching pigments, permanent pigments, anthraquinone-based pigments, perylene-based pigments and condensed azo-based pigments.

If the refractive index of the buffer layer is made intermediate between the refractive indexes of the hard coat layer and the plastic base film, it becomes possible to prevent interference bands caused by the difference in refractive indexes of the hard coat layer and plastic base film, and this is preferred for enhanced appearance quality in cases where the hard coat film is used for a display surface.

The thickness of the hard coat layer is preferably 3–15 μm, and more preferably 3–10 μm. If the thickness of the hard coat layer is less than 3 μm, the pencil hardness will be insufficient for a hard coat film, and if it is over 15 μm the pencil hardness will be improved but cracking and peeling will more readily occur. For a high pencil hardness of the hard coat film, the pencil hardness of the hard coat layer is preferably in the range of 3H–5H.

As materials for forming the hard coat layer there may be mentioned ionizing radiation curing resins, thermosetting resins, thermoplastic resins and engineering plastics. Ionizing radiation curing resins are preferred because they can be easily formed into films on plastic base films and can easily give the desired high pencil hardness values.

The following may be mentioned as ionizing radiation curing resins which can be used for the hard coat layer or the buffer layer.

The ionizing radiation curing resin is preferably one with an acrylate-based functional group, and more preferably a polyester acrylate or urethane acrylate. A polyester acrylate in this case preferably consists of an acrylate or methacrylate (throughout the present specification, acrylates and/or methacrylates will be referred to simply as (meth)acrylates) of a polyester-based polyol oligomer, or a mixture thereof. A urethane acrylate is a compound obtained by acrylating an oligomer made from a diisocyanate compound and a polyol compound.

As preferred acrylate-composing monomers there may be mentioned methyl (meth)acrylate, ethyl (meth)acrylate, butyl (meth)acrylate, 2-ethylhexyl (meth)acrylate, methoxyethyl (meth)acrylatc, butoxyethyl (meth)acrylate and phenyl (meth)acrylatc.

At the same time, a polyfunctional monomer may also be used to provide even greater hardness to the coating. Preferred examples of polyfunctional monomers include trimethylolpropane tri(meth)acrylate, hexanediol (meth)acrylate, tripropyleneglycol di(meth)acrylate, diethyleneglycol di(meth)acrylate, pentaerythritol tri(meth)acrylate, dipentaerythritol hexa(meth)acrylate, 1,6-hexanediol di(meth)acrylate and neopentylglycol di(meth)acrylate.

Preferred examples of polyester-based oligomers include polyadipate polyols and polysebacate polyols, which are condensation products of adipic acid and glycols (ethylene glycol, polyethylene glycol, propylene glycol, polypropylene glycol, butylene glycol, polybutylene glycol, etc.) or triols (glycerin, trimethylolpropane, etc.), and sebacic acid and glycols or triols.

A part or all of the aliphatic dicarboxylic acids mentioned above may be replaced with other organic acids. For example, isophthalic acid, terephthalic acid, phthalic anhydride or the like may be used as a constituent to provide greater hardness. Polyurethane-based oligomcrs can be obtained from condensation products of polyisocyanates and polyols. For example, they may be obtained by reaction between a compound selected from among methylene bis (p-phenylenediisocyanate) and hexamethylenediisocyanate hexanetriol addition products, hexamethylene diisocyanate, tolylene diisocyanate and tolylene disocyanate trimethylolpropane adducts, 1,5-naphthylene diisocyanate, thiopropyl diisocyanate, ethylbenzene-2,4-diisocyanate, 2,4-tolylenediisocyanate dimers, hydrogenated xylylene diisocyanate, tris(4-phenylisocyanate) neophosphate, etc. and one of the following polyols.

Preferred examples of polyols include polyether-based polyols such as polyoxytetramethylene glycols; polyester-based polyols such as polyadipate polyols, polycarbonate polyols; and copolymers of acrylic acid esters and hydroxyethyl methacrylate, etc.

In addition, when an ionizing radiation curing resin is used as the ultraviolet curing resin, a photopolymerizing agent such as an α-amyloxym ester or thioxanthone, or a photosensitizing agent such as n-butylamine, triethylamine or tri-n-butylphosphine may be used in combination.

Urethane acrylates have high elasticity and flexibility and therefore offer superior workability (bendability), but they cannot give products with a pencil hardness of 2H or higher because of their poor surface hardness. On the other hand, polyester acrylates can provide hardness if the polyester constituents are appropriately selected.

In order to obtain a flexible hard coat film, it is preferred to add 40–10 parts by weight of a polyester acrylate to 60–90 parts by weight of a urethane acrylate, as this will give a hard coat film with both high hardness and flexibility.

Also, inorganic fine particles with a mean secondary particle size of 20 μm or less and preferably in the range of 0.1–15 μm are preferably added to the application solution at 0.3–3 parts by weight to 100 parts by weight of the resin component in order to adjust the luster and provide the surface with lubricity (not releasability). At less than 0.3 parts by weight it is impossible to provide the desired lubricity, and at greater than 3 parts by weight the pencil hardness may be lowered. The fine particles used may be inorganic fine particles of silica, magnesium carbonate, aluminum hydroxide or barium sulfate, or even fine particles of an organic polymer such as a polycarbonate, acrylic (resin), polyimide, polyamide, polyethylene naphthalate or melamine (resin).

The method used to apply the hard coat layer or buffer layer may be roll coating, gravure coating, bar coating, extrusion coating or the like, and the hard coat layer may be formed by any conventional publicly known method depending on the properties of the coating composition and the coating amount.

An anti-reflection layer may be formed on the surface of the hard coat layer by any of the following film-forming methods.

(a) A method whereby an ultrathin film of $MgF_2$ is formed to a thickness of about 0.1 μm as the anti-reflection layer.

(b) A method whereby a metal vapor deposited film is formed as the anti-reflection layer.

(c) A method whereby a low refractive index layer made of a material with a lower light refractive index than the refractive index of the hard coat layer is provided as the anti-reflection layer.

(d) A method whereby a high refractive index layer is laid adjacent to the hard coat layer and a low refractive index layer is formed thereover as the anti-reflection layer. For example, an ultrafine particle layer of a metal oxide with a high refractive index may be situated in the anti-reflection layer at a site adjacent to the hard coat layer.

(e) A method whereby the layer structure of (d) above is repeated to form a laminate as the anti-reflection layer.

(f) A method whereby an intermediate refractive index layer, high refractive index layer and low refractive index layer are formed as the anti-reflection layer.

The present invention will now be explained in more detail based on the following examples.

EXAMPLE 1

A readily adhesive polyethylene terephthalate film (trade name: A4350, manufactured by Toyobo K.K., Japan) with a thickness of 188 μm was used as a transparent plastic base film, and it was coated with urethane acrylate (trade name: Shiko UV-6300B, manufactured by Nihon Gosei K.K., Japan) to a dry thickness of about 20 μm as a buffer layer, which was then cured with an electron beam at an acceleration voltage of 175 KV and an irradiation exposure of 3 Mrad to obtain an approximately 20 μm buffer layer.

Next, an ionizing radiation curing resin (trade name: PET D-31, manufactured by Dainichi Seika K.K., Japan) was applied to a dry thickness of about 6 μm as a hard coat layer, and the layer was cured with an electron beam at an acceleration voltage of 175 KV and an irradiation exposure of 10 Mrad to obtain an approximately 6 μm hard coat layer.

EXAMPLE 2

Sputtering was used to form ITO to 27 nm, $SiO_2$ to 24 nm, ITO to 75 nm and $SiO_2$ to 92 nm as anti-reflection layers on the hard coat layer of the hard coat film obtained in Example 1 above, to obtain an anti-reflection film.

EXAMPLE 3

A coloring agent composed of a mixture of 8.2 parts carbon black (Special Black 250, manufactured by Degusa Co.), 4.4 parts phthalocyanine blue (Cyanine Blue CP-1, manufactured by Dainichi Seika) and quinacridone (Posterperm Pink E02, manufactured by Clariant Co.) was added to the buffer layer of the hard coat film of Example 1 at 3 parts by weight to 100 parts by weight of urethane acrylate, and the rest of the procedure of Example 1 was repeated to obtain a hard coat film with a total light transmittance of 65%.

EXAMPLE 4

One side of a 50-$\mu$m thick polyethylene terephthalate film (trade name: MC-19, manufactured by Reiko K.K., Japan) which had been treated on the surface thereof with acrylmelamine resin was coated with a $ZrO_2$ fine particle coating solution No.1275 (coating solution comprising 3 parts by weight of a binder to 15 parts by weight of $ZrO_2$ fine particles: manufactured by Sumitomo Osaka Cement K.K., Japan) to a dry thickness of 57 nm. This was further coated with the hard coating agent mentioned above to a dry thickness of about 6 $\mu$m as a hard coat layer, and the layer was cured with an electron beam at an acceleration voltage of 175 KV and an irradiation exposure of 5 Mrad to obtain a transfer film.

Also, a readily adhesive polyethylene terephthalate film (trade name: A4350, manufactured by Toyobo K.K.,) with a thickness of 188 $\mu$m was used as a transparent plastic base film and was coated with urethane acrylate (trade name: Shiko UV-6300B, manufactured by Nihon Gosei K.K.) to a dry thickness of about 20 $\mu$m as a buffer layer, and after laminating the uncured film against the hard coat layer side of the transfer film obtained earlier, it was cured with an electron beam at an acceleration voltage of 200 KV and an irradiation exposure of 10 Mrad.

Next, the 50-$\mu$m thick polyethylene terephthalate film (trade name: MC-19, manufactured by Reiko K.K.) which had been treated on the surface with acrylmelamine resin to serve as a release film was released from the cured laminate to obtain a hard coat film with an anti-reflection layer formed of fine particles. Sputtering was used to form ITO to 105 nm and $SiO_2$ to 85 nm as additional anti-reflection layers to obtain an anti-reflection film.

COMPARATIVE EXAMPLE 1

A readily adhesive polyethylene terephthalate film (trade name: A4350, manufactured by Toyobo K.K.) with a thickness of 188 $\mu$m was used as a transparent plastic base film, and it was coated with an ionizing radiation curing resin (trade name:

PET D-31, manufactured by Dainichi Seika K.K.) to a dry thickness of about 6 $\mu$m as a hard coat layer, which was then cured with an electron beam at an acceleration voltage of 175 KV and an irradiation exposure of 10 Mrad to obtain a hard coat film.

COMPARATIVE EXAMPLE 2

A hard coat film was obtained in the same manner as Comparative Example 1 except that the dry thickness of the hard coat layer was 25 $\mu$m.

COMPARATIVE EXAMPLE 3

Sputtering was used to form ITO to 75 nm and $SiO_2$ to 92 nm as anti-reflection layers on the hard coat film obtained in Comparative Example 1, to obtain an anti-reflection film.

COMPARATIVE EXAMPLE 4

A coloring agent was added to the hard coat layer of the hard coat film of Comparative Example 1 at 9 parts by weight to 100 parts by weight of the ionizing radiation curing resin, to obtain a hard coat film with a total light transmittance of 65%.

Table 1 shows the pencil hardnesses of each of the hard coat films obtained in Examples 1–4 and Comparative Examples 1–4, the pencil hardnesses of the transparent plastic base films used in each of the hard coat films and the pencil hardnesses of each layer in each of the hard coat films. The pencil hardnesses of the layers were determined using samples prepared by coating a 188-$\mu$m thick polyethylene terephthalate film with each layer-forming material to a dry film thickness of about 5 $\mu$m.

Table 1 also shows the results of evaluating the degree of curling in each of the obtained hard coat films, as ⊚ (absolutely no curling), ○ (almost no curling) or X (evident curling). The adhesive property of each of the obtained hard coat films was also evaluated as a ratio of the number of samples with satisfactory adhesion out of one hundred 1.5 mm square samples, as shown in Table 1.

According to Table 1, forming a buffer layer between the plastic base film and the hard coat layer with an orderly increase of the pencil hardness in the order of lamination of each layer yields a hard coat film with minimal curling and peeling, and a pencil hardness of 4H or greater.

TABLE 1

|  | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|
| Pencil hardness of plastic base | B | B | B | B | B | B | B | B |
| Pencil hardness of buffer layer | H | H | H | H | — | — | — | — |
| Pencil hardness of hard coat layer | 3H | 3H | 3H | 3H | 3H | 3H | 3H | 2H |
| Pencil hardness of hard coat film | 5H | 5H | 5H | 4H | 3H | 5H | 3H | 2H |
| Degree of curling | ○ | ⊚ | ○ | ⊚ | ○ | X | ○ | ○ |
| Adhesive property | 100/100 | 100/100 | 100/100 | 100/100 | 100/100 | 0/100 | 100/100 | 100/100 |

What is claimed is:

1. A hard coat film comprising:

a plastic base film having a pencil hardness from 4B to HB;

a buffer layer composed of one or a plurality of layers with a total thickness of 3–50 $\mu$m formed on at least one side of said plastic base film, said buffer layer having a pencil hardness that is intermediate between the pencil hardness of said plastic base film and the pencil hardness of a hard coat layer;

a hard coat layer with a thickness of 3–15 μm and a pencil hardness from 3H to 5H; and an anti-reflection layer formed on the surface of said hard coat layer, the hard coat film being designed such that the respective pencil hardness of said plastic base film, buffer layer and hard coat layer have increasing values in that order, in such a manner that the hard coat film as a whole has a pencil hardness of from 4H to 8H.

2. A hard film according to claim 1, wherein said buffer layer has a function of buffering against deformation of the hard coat layer in response to deformation of said plastic base film.

3. A hard coat film according to claim 1, wherein the material for forming said buffer layer comprises an ionizing radiation curing resin.

4. A hard coat film according to claim 1, where said buffer layer contains a coloring agent.

5. A hard coat according to claim 1, wherein the refractive index of said buffer layer is a value intermediate between the refractive index of said hard coat layer and the refractive index of said plastic base film.

6. A hard coat film according to claim 1, wherein the material for forming said hard coat layer comprises an ionizing radiation curing resin.

7. A hard coat film according to claim 1, wherein the hard coat film has a glare resistance due to irregular formation of the surface thereof.

8. A hard coat film according to claim 1, which has an ultrafine particle layer of a metal oxide on at least a portion of a site of said anti-reflection layer adjacent to said hard coat layer.

9. A hard coat film comprising:

a buffer layer composed of one or a plurality of layers with a total thickness of 3–50 μm formed on at least one side of a plastic base film;

a hard coat layer with a thickness of 3–15 μm formed on said buffer layer; and an anti-reflective film formed on the surface of said hard coat layer, the hard coat film being designed such that the pencil hardness of the laminate prepared by orderly lamination of said plastic base film, buffer layer and hard coat layer has a value which increases with the lamination of each layer, in such a manner that the hard coat film as a whole has a pencil hardness from 4H to 8H.

10. A hard coat film according to claim 9, wherein the pencil hardness of said plastic base film is from 4B to HB, the pencil hardness of said hard coat layer is from 3H to 5H, and the pencil hardness of said buffer layer is a value intermediate between the pencil hardness of the plastic base film and the pencil hardness of the hard coat layer.

11. A hard coat film according to claim 9, wherein said buffer layer has a function of buffering against deformation of the hard coat layer in response to deformation of said plastic base film.

12. A hard coat film according to claim 9, wherein the material for forming said buffer layer comprises an ionizing radiation curing resin.

13. A hard coat film according to claim 9, wherein said buffer layer contains a coloring agent.

14. A hard coat film according to claim 9, wherein the refractive index of said buffer layer is a value intermediate between the refractive index of said hard coat layer and the refractive index of said plastic base film.

15. A hard coat film according to claim 9, wherein the material for forming said hard coat layer comprises an ionizing radiation curing resin.

16. A hard coat film according to claim 9, wherein the hard coat film has a glare resistance due to irregular formation of the surface thereof.

17. A hard coat film according to claim 1, which has an ultrafine particle layer of a metal oxide on at least a portion of a site of said anti-reflection layer adjacent to said hard coat layer.

* * * * *